Patented Mar. 6, 1934

1,949,715

UNITED STATES PATENT OFFICE 1,949,715

FERTILIZER CONTAINING PHOSPHORUS, NITROGEN AND POTASSIUM COMPOUNDS

Christian Johannes Hansen, Essen-Ruhr, Germany, assignor, by mesne assignments, to The Koppers Company of Delaware, Pittsburgh, Pa., a corporation of Delaware No Drawing. Application September 11, 1931, Serial No. 562,423. In Germany September 12, 1930

1 Claim. (Cl. 71—9)

The invention relates to mineral salt fertilizers containing phosphorus-, nitrogen- and potassium-compounds and more especially to such fertilizers in which the potassium is present in the form of chloride or sulphate.

The chloride of potash salt, usually met with in the trade has, as is well known, in consequence of the unavoidable presence of magnesium salts, a certain percentage of moisture, which considerably reduces the possibilities of spreading same readily and at the same time the utility of this salt as a fertilizer. The same disadvantage have sulphate of potash or other potash salts containing magnesium salts.

The object of the invention therefore is to provide a good spreading fertilizer, which contains phosphorus-, nitrogen- and potassium-compounds and the potash in the form of a salt containing magnesium compounds.

The fertilizer according to the invention consists in a mixture of ammonium phosphate, ammonium sulphate and a potash salt usually to be found in commerce, viz. the chloride of potash.

Preferably the fertilizer according to the invention consists of 38.60 parts ammonium sulphate, 38.30 parts mono-ammonium phosphate, and 33.20 parts technical chloride of potash customary in commerce, with a content of about 42% $K_2O$.

A further object of the invention is to provide a process for the production of a fertilizer containing phosphorus-, nitrogen- and potassium-compounds by using technical potash salts i. e. salts containing magnesium compounds and therefore moisture and which are themselves not readily spread.

The process according to the invention consists in the fact that the damp clotting potash salt is mixed with a dry ammonium sulphate and ammonium phosphate. In this way, there results immediately a dusty dry salt mixture which does not clot but gives an excellent possibility of being spread.

For carrying out the process, according to this invention, it is optional to take either mono-ammonium phosphate or diammon-phosphate. If one takes mono-ammonium-phosphate, it will be suitable to mix 38,60 parts ammonium sulphate, 28,30 parts mono-ammonium phosphate, and 33,20 parts technical chloride of potash, with a content of 42% $K_2O$.

The salt then contains 11,6% _____ nitrogen
17,5% _____ $P_2O_5$ and
14,0% _____ $K_2O$ When using diammonium phosphate it will be suitable to mix 25,40 parts of ammonium sulphate, 36,80 parts diammonium phosphate, and 37,80 parts technical chloride of potash with a content of 42% $K_2O$.

The resulting salts contain then 13,20% _____ nitrogen
19,80% _____ $P_2O_5$
15,90% _____ $K_2O$ To carry out the process according to the invention it is suitable to make use of a customary mixing arrangement, for instance, a vessel fitted with a stirrer or a usual mixing worm.

The fertilizer, according to this invention, has in addition to the advantage of being well adapted for spreading, the further important advantage that it contains nitrogen, phosphorus and potash and this in a very suitable proportion.

The invention as hereinabove set forth is embodied in a particular form, but may be variously embodied within the scope of the claim hereinafter made.

I claim:

A dry dusty fertilizer salt mixture consisting principally of originally dry mono-ammoniumphosphate, dry ammoniumsulphate and a damp clotting potassium salt containing a small percentage of hygroscopic magnesium salts.

CHRISTIAN JOHANNES HANSEN.